US011176353B2

(12) United States Patent
Slatcher et al.

(10) Patent No.: US 11,176,353 B2
(45) Date of Patent: Nov. 16, 2021

(54) THREE-DIMENSIONAL DATASET AND TWO-DIMENSIONAL IMAGE LOCALIZATION

(71) Applicant: GeoSLAM Limited, Ruddington (GB)

(72) Inventors: Neil Slatcher, Ruddington (GB); Alex Bentley, Ruddington (GB); Cheryl Smith, Ruddington (GB)

(73) Assignee: Geoslam Limited, Ruddington (GB)

(*) Notice: Subject to any disclaimer, the term of this patent is extended or adjusted under 35 U.S.C. 154(b) by 100 days.

(21) Appl. No.: 16/808,899

(22) Filed: Mar. 4, 2020

(65) Prior Publication Data
US 2020/0285831 A1 Sep. 10, 2020

(30) Foreign Application Priority Data
Mar. 5, 2019 (GB) .................................... 1902925

(51) Int. Cl.
G06K 9/00 (2006.01)
G06T 7/246 (2017.01)

(52) U.S. Cl.
CPC .......... *G06K 9/00208* (2013.01); *G06T 7/246* (2017.01); *G06T 2207/10028* (2013.01)

(58) Field of Classification Search
CPC ............... G06K 9/00208; G06T 7/246; G06T 2207/10028
See application file for complete search history.

(56) References Cited

U.S. PATENT DOCUMENTS

2008/0310757 A1* 12/2008 Wolberg ............ G06K 9/00208
382/285
2010/0204974 A1* 8/2010 Israelsen ................. G01S 17/86
703/17

FOREIGN PATENT DOCUMENTS

CN 108198145 A 6/2018
WO 2018213338 A1 11/2018

* cited by examiner

Primary Examiner — Kenny A Cese
(74) Attorney, Agent, or Firm — Ziolkowski Patent Solutions Group, SC

(57) ABSTRACT

The disclosure relates to corresponding apparatus, computer program and method for receiving three-dimensional, 3D, map-data, in which a plurality of locations within the 3D-map-data are association with respective 3D-data-capture-locations of a 3D-camera, and in which 3D-camera-timing-information is associated with each of the plurality of locations; receiving one or more two-dimensional, 2D, images from a 2D-camera, in which 2D-camera-timing-information is associated with each 2D-image, and in which each 2D-image is captured when a movement of the 3D-camera is less than a threshold level; identifying 3D-camera-timing-information associated with locations within the 3D-map-data that correspond to 3D-data-capture-locations with a movement level of the 3D-camera less than the threshold level; associating, in a combined dataset, each 2D-image with a corresponding location within the 3D-map-data by a data processing unit correlating the 2D-camera-timing-information with the identified 3D-camera-timing-information.

20 Claims, 4 Drawing Sheets

THREE-DIMENSIONAL DATASET AND TWO-DIMENSIONAL IMAGE LOCALIZATION

The disclosure relates to the field of three-dimensional (3D) dataset and two-dimensional (2D) image localisation and in particular, although not exclusively, relates to matching two-dimensional images to associated locations in three-dimensional map-data.

BACKGROUND

Depth sensing device apparatuses are known for generating 3D-depth-maps. Examples of such devices include a Light Detection and Ranging (Lidar) camera, stereoscopic camera or plenoptic camera. In some known systems, localization of the device may be achieved by moving the device to build up a 3D-map of its environment. Lidar data provides a depth map of a location in the form of a three-dimensional (3D) point cloud. Lidar-based Simultaneous Localization And Mapping (SLAM) systems enable 3D-map-data of an environment to be generated in a simple and efficient manner. To aid in the interpretation of 3D-map-data generated by SLAM devices, SLAM systems may be integrated with digital cameras to provide a visual context to the 3D data, in the form of two-dimensional (2D) images. In some examples, the 2D-images captured by the digital camera are localised within the 3D-map-data generated by the SLAM device, enabling the user to view imagery that is referenced to specific locations within the 3D-map-data. Such a combined dataset may assist the user in interpreting the dataset, which corresponds to a real-world 3D environment.

However, known methods for localising 3D-map-data and 2D-images have been found to suffer from a number of difficulties, such as increased computational complexity or requiring direct hardware interaction between, or compatibility of, the 2D and 3D camera systems.

SUMMARY

According to a first aspect of the disclosure there is provided a method, comprising:
  receiving three-dimensional, 3D, map-data (e.g. from a 3D-camera), in which a plurality of locations within the 3D-map-data are association with respective (e.g. real-world) 3D-data-capture-locations of a 3D-camera, and in which 3D-camera-timing-information is associated with each of the plurality of locations;
  receiving one or more two-dimensional, 2D, images from a 2D-camera, in which 2D-camera-timing-information is associated with each 2D-image, and in which each 2D-image is captured when a movement level of the 3D-camera is less than a threshold level;
  identifying 3D-camera-timing-information associated with locations within the 3D-map-data that correspond to 3D-data-capture-locations with a movement level of the 3D-camera less than the threshold level;
  associating, in a combined dataset, each 2D-image with a corresponding location within the 3D-map-data by a data processing unit correlating the 2D-camera-timing-information with the identified 3D-camera-timing-information.

The method may be a computer-implemented method. The method as a whole may be performed by the data processing unit. A real-world 3D-data-capture-location may be a location within the real world that a 3D-camera was situated when it captured a portion of the 3D-map-data. The one or more 2D-images may provide a series of 2D-images The movement may one or more of a change in position over a period of time, a velocity, such as a linear or angular velocity, an acceleration, such as a linear or angular acceleration, or an impulse. The 3D-camera-timing-information may be a timestamp, a sequence order or sequence number. The 2D-camera-timing-information may be a timestamp, a sequence order or sequence number. The series 2D-images may be received subsequent to capture of the series of 2D-images.

Correlating the 2D-camera-timing-information with the 3D-camera-timing-information associated with the identified locations within the 3D-map-data may comprises one or more of:
  identifying a pattern in the 2D-camera-timing-information;
  identifying a pattern in the 3D-camera-timing-information; and
  matching, in the time domain, corresponding 2D-camera-timing-information and 3D-camera-timing-information of the respective patterns.

Matching corresponding 2D-camera-timing-information and 3D-camera-timing-information of the respective patterns may comprise iteratively adjusting an offset between the 2D-camera-timing-information and 3D-camera-timing-information in order to improve, or maximise, a correspondence between the pattern of 2D-camera-timing-information and the pattern of 3D-camera-timing-information.

The threshold level may relate to the 3D-camera being stationary. The threshold level may be a velocity of one of 0.1, 0.2, 0.3, 0.4 or 0.5 m/s, for example. The field of view of the 2D-camera may at least partially correspond to a field of view of the 3D-camera during capture of the 3D-map-data and 2D-images.

The 2D-camera may be co-located with the 3D-camera during capture of the 3D-map-data and one or more 2D-images. Timing systems of the 2D-camera-device and 3D-camera-device may not be synchronized.

The method may comprise determining a movement profile of the 3D-camera based on the 3D-map-data or using a satellite-positioning-system. The method may comprise determining when a movement of the 3D-camera is less than the threshold level based on the movement profile. The method may comprise capturing, by a user, a 2D-image using the 2D-camera when a movement of the 3D-camera is less than a threshold level. The method may comprise instructing the user to capture an image using the 2D-camera in response to the movement of the 3D-camera meeting or passing the threshold level.

The method may comprise the user removably attaching a housing of a 2D-camera-device comprising the 2D-camera to a housing of a 3D-camera-device comprising the 3D-camera.

According to a further aspect of the disclosure there is provided a data processing unit configured to perform any computer-implementable method described herein. The data processing unit may comprise one or more processors and memory, the memory comprising computer program code configure to cause the processor to perform any computer-implementable method described herein.

According to a further aspect of the disclosure there is provided a computer readable storage medium comprising computer program code configure to cause a processor to perform any computer-implementable method described herein. The computer readable storage medium may be a non-transitory computer readable storage medium.

According to a further aspect of the disclosure there is provided a 3D-camera-device comprising the data processing unit or the computer readable storage medium.

There may be provided a computer program, which when run on a computer, causes the computer to configure any apparatus, including a circuit, unit, controller, device or system disclosed herein to perform any method disclosed herein. The computer program may be a software implementation. The computer may comprise appropriate hardware, including one or more processors and memory that are configured to perform the method defined by the computer program.

The computer program may be provided on a computer readable medium, which may be a physical computer readable medium such as a disc or a memory device, or may be embodied as a transient signal. Such a transient signal may be a network download, including an internet download. The computer readable medium may be a computer readable storage medium or non-transitory computer readable medium.

BRIEF DESCRIPTION OF FIGURES

Embodiments of the present invention will now be described by way of example and with reference to the accompanying drawings in which.

DESCRIPTION OF EXAMPLES

Figure 1:
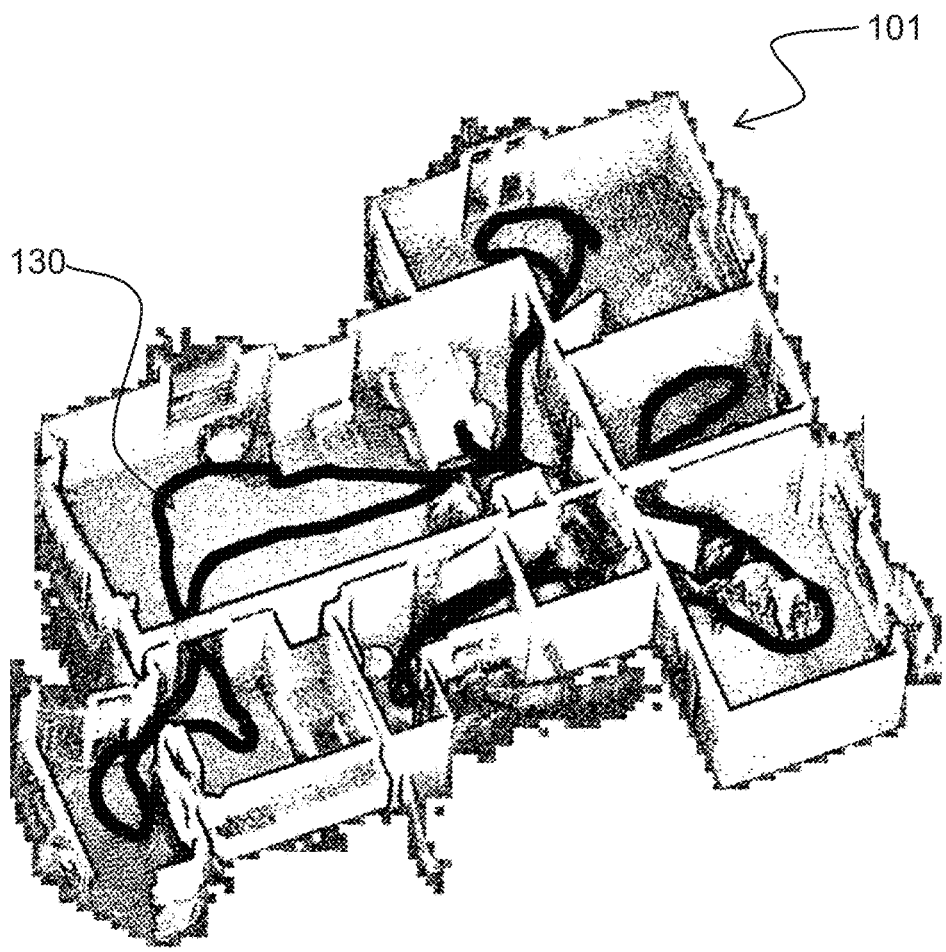
FIG. 1 illustrates an isometric perspective view of 3D-map-data obtained by a three-dimensional-camera.
Figure 2A:
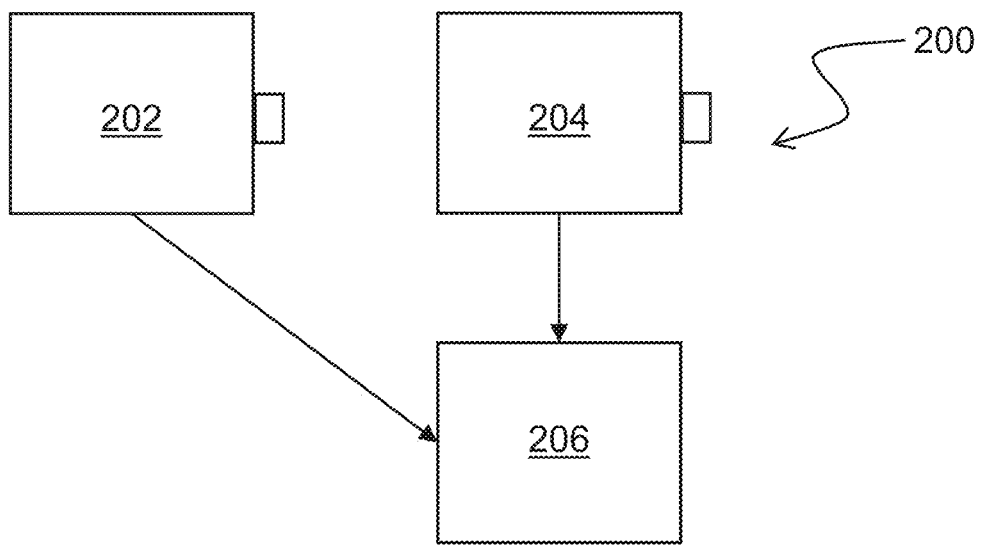
FIG. 2a illustrates a system comprising a 3D-camera, a two-dimensional-camera and a data processing unit.
Figure 2B:
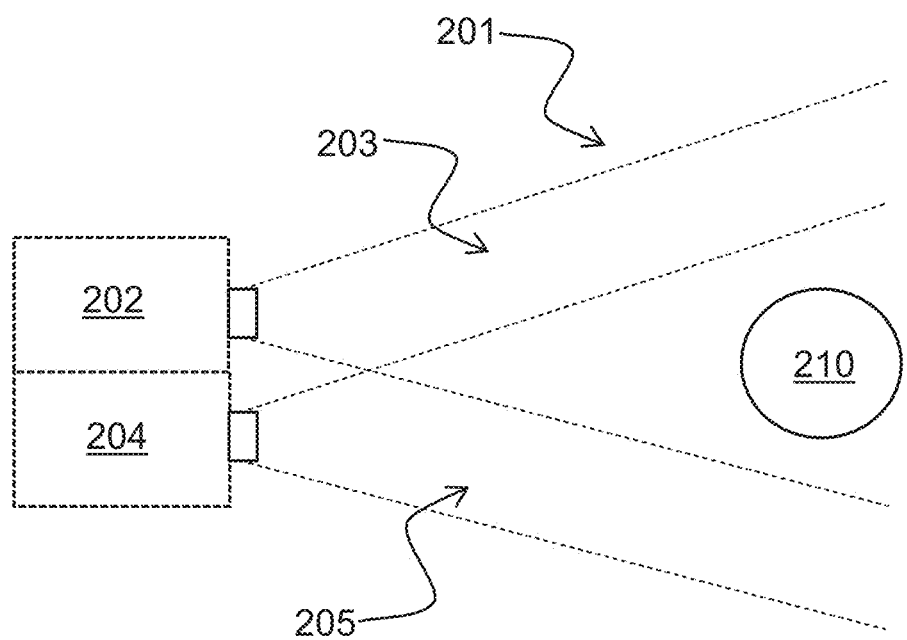
FIG. 2b illustrates a schematic plan view of a scene comprising a camera system.

FIG. 1 illustrates an isometric perspective view of a SLAM dataset 101 obtained by a SLAM device comprising a three-dimensional-camera, such as a Lidar camera.

The 3D-camera generates point-cloud data describing the environment in its field of view. The point-cloud data may be updated at a refresh rate of 100 Hz, for example. The SLAM dataset 101 is built up by the 3D-camera travelling within an environment, such as a building, and constructing the dataset based on the point cloud data received as it moves. New point cloud data is referenced to the existing SLAM dataset in so that regions of the environment that have not been previously viewed can be added to the SLAM dataset 101. In addition, a dataset generated by a SLAM device, such as ZEB-REVO® available from GeoSLAM Limited, may contain information that describes the device's location through time within the 3D map data. That is, a profile of the movement of the device as a function of time. In this way, a route 130 of the device used to generate the SLAM dataset may be saved. Timing-information, which describes a system time of the SLAM device, may be associated with each location on the route 130.

To integrate 3D-map-data, such as a SLAM dataset, and 2D-images such as those captured by a digital camera, a common time reference between the camera and SLAM device must be established. This common time reference enables each image to be precisely located in the 3D map data. If the common reference time at which each image captured is known, then the location at which each image was captured can be derived through matching the time at which the image was captured to the time (and thus 3D location) in the SLAM 3D-map-data. This approach enables the 3D location at which each image was captured to be derived.

A challenging aspect of integrating a SLAM device and a digital camera is establishing a common time reference between the 2D-camera and the SLAM device. It is common for SLAM devices and digital camera systems to use different time references that do not directly correlate to one another. Establishing a common 'shared' time reference for the data captured from the SLAM system and the 2D-camera enables the data to be usefully integrated.

One approach to establish a common time reference requires either direct hardware synchronisation between the 2D-camera and SLAM system or complex processing of video data streams captured using a suitable video-enabled 2D-camera. Both approaches impose significant limitations on the range of camera systems that can be used to capture digital images during SLAM data capture. Direct hardware synchronisation may require the 2D-camera and SLAM device to share a common physical data communication interface that can be used to exchange suitable timing information. This requires that the SLAM device and 2D-camera are both engineered to support this common interface. Video-based time synchronisation may use an approach called 'visual odometry' to derive the 3D motion of the camera through space. If the video camera is rigidly mounted to the SLAM device, common patterns in both devices' motion through 3D space can be identified and used to localise each video frame inside the 3D SLAM map. A limitation of this approach is that it requires a suitable video-enabled, high-resolution camera to capture data that can be successfully processed using visual odometry techniques. This limits the number of suitable camera devices that can be integrated into a SLAM system and imparts substantial data processing requirements on the system.

A system, method and computer program that enable software-based synchronisation of any digital camera to a 3D-camera using a 'stop-and-go' methodology are discussed below with reference to FIGS. 1, 2a, 2b, 3 and 4. The approach used may enable 2D-images captured by a digital camera to be localised within the 3D-map-data generated by the 3D-camera device to provide image-based contextual imagery to the 3D-map-data. In contrast to the examples discussed above, such an approach may not require either:

a) Hardware-based synchronisation of the 3D-camera and 2D-camera.

b) Software based synchronisation of the 3D-camera and 2D-camera using advanced computer vision and visual odometry algorithms that require the capture of a continuous video stream from the camera system during data capture.

FIG. 1a illustrates a system 200 comprising a three-dimensional (3D)-3D-camera 202, a two-dimensional (2D)-camera 204 and a data processing unit 206. The 3D-camera 202, 2D-camera 204 and data processing units 206 may be provided by a single, or more typically, a plurality of separate devices.

The 3D-camera may be provided by any depth sensing device apparatus, such as a SLAM system or other Light Detection and Ranging (Lidar) camera, stereoscopic camera or plenoptic camera, for example. The 3D-camera is configured to capture 3D-map-data describing an environment in a field of view of the camera 202. For example, the 3D-camera may be configured to obtain point-cloud data associated with its real-world location. The 3D-camera may be configured to determine its location at each point using SLAM techniques as described above with reference to FIG. 1. 3D-camera-timing-information is associated with each location at which the point-cloud data is obtained. The 3D-camera-timing-information may be a timestamp, a sequence order or sequence number.

The 2D-camera is configured to capture a photograph of an environment within a field of view of the 2D-camera 204. 2D-camera-timing-information is associated with each 2D-image. Like the 3D-camera-timing-information, the 2D-camera-timing-information may be a timestamp, a sequence order or sequence number. However, the 2D-camera-timing-information is not necessarily of the same format as, or have any synchronization with, the 3D-camera-timing-information. The 2D-camera may be a conventional digital 2D-image camera, for example. The 2D-camera 204 may be a still image camera or a video camera.

The 3D-camera 202 and the 2D-image-camera 204 may be housed in separate devices. The 3D-camera 202 is not necessarily directly interoperable with the 2D-image-camera 204. That is, the 3D-camera 202 and the 2D-image-camera 204 may not be configured to exchange timing-information with one another.

The data processing unit 206 may be housed in a separate device to both the 3D-camera 202 and the 2D-image camera 204. Alternatively, the data processing unit 206 may be distributed amongst two or more devices. For example, some aspects of the tasks performed by the data processing unit 206 may be performed by a 3D-camera-device comprising the 3D-camera 202. Other aspects of the processing performed by the data processing unit 206 may be performed separately from the 3D-camera-device.

The data processing unit 206 is configured to receive a series of 2D-images from the 2D-camera 204 and configured to receive 3D-map-data from the 3D-camera 202. The 3D-map-data and the series of 2D-images may be communicated wirelessly or by a wired connection between the 3D-camera 202, 2D-camera 204 and data processing unit 206. Such communication may be achieved via conventional means using methods known in the art. For example, a transfer of the series of 2D-images from the 2D-camera to the data-processing unit may be achieved using a removable memory card.

In some examples, the data processing unit 206 may comprise appropriate conventional hardware, including one or more processors and memory comprising computer program code configured to cause the processor to perform a method as described below with reference to FIGS. 2 and 3.

FIG. 1b illustrates a schematic plan view of an environment 201 at a real-world location comprising a 3D-camera-device 202, a 2D-camera device 204 and an object 210.

The 3D-camera-device 202 is co-located with the 2D-camera-device 204. That is, the 3D-camera-device 202 and the 2D-camera-device 204 are in substantially the same place and a field of view 203 of the 3D-camera-device 202 at least partially coincides with a field of view 205 of the 2D-camera-device 204. In this example, the field of view 203 of the 3D-camera-device 202 coincides with the field of view 205 of the 2D-camera-device 204 such that the object 210 is in both fields of view 203, 205. In this way, a series of 2D-images may be obtained by the 2D-3D-camera-device 202 that correspond to locations in the 3D-map-data obtained by the 3D-camera-device 202.

In this example, the 3D-camera-device 202 is a separate device from, but physically connected to, the 3D-camera-device 204. In this way, a known correspondence between the fields of view 203, 205 of the cameras 202, 204 may be known and reproducible between images. In some examples, a housing of the 3D-camera-device 202 may be configured to be detachably coupled to a housing of the 2D-camera-device 204. In some examples, the housing of the 3D-camera 202 may comprise a screw thread for removably mounting the 2D-camera-device 204, using industry standard thread size (such as ¼ inch (6.35 mm) diameter 20 UNC thread), for example.

The 3D-camera-device 202 may be carried by a user or mounted on a vehicle, such as a land vehicle or watercraft. A user may capture data by walking or travelling around with a 3D-camera-device and stopping to capture images at locations during the 3D-data capture to provide the 'stop-and-go' type methodology described below with reference to FIGS. 3 and 4. In this way, the user collects a series of 2D-images when the 3D-camera-device 202 is stationary. The location at which each image was captured may then be identified using a software-based synchronisation approach to establish a common time reference between the camera and 3D-camera-device. This enables the image to be localised within the 3D-map-data. This approach may enable greater flexibility in the selection of an appropriate 2D-camera by the end user. The choice of camera is not necessarily limited to devices that implement a hardware-based interface between the 3D-camera and 2D-camera, or 2D-cameras that capture video-stream data suitable for visual odometry.

Figure 3:
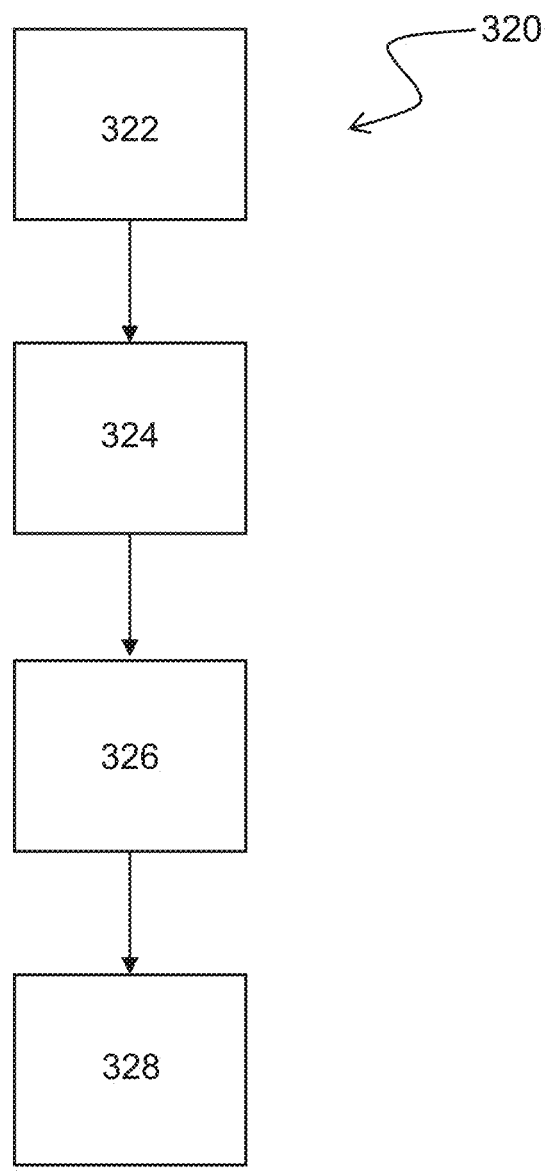
FIG. 3 illustrates a method for matching two-dimensional-images to associated three-dimensional-depth-maps.

FIG. 3 illustrates a method 320 for matching two-dimensional images to associated three-dimensional map-data. In its broadest sense, the method encompasses steps that may be performed by the hardware and/or software in the data processing unit of FIG. 2 and also encompasses a physical method steps that may be performed by a user operating the system of FIG. 2.

Three-dimensional, 3D, map-data is received 322 from a 3D-camera. The 3D-map-data may be received in the sense that it is captured by a 3D-camera-device or received in the sense that it is received from a 3D-camera-device. A plurality of locations within the 3D-map-data are association with respective real-world 3D-data-capture-locations of a 3D-camera. The locations within the 3D-map-data may be determined using SLAM methodology, as discussed previously with reference to FIG. 1. 3D-camera-timing-information is associated with each of the plurality of locations for 3D-camera-timing-information.

A series of two-dimensional, 2D, images is received 324 by the data processing unit from a 2D-camera. Each 2D-image is captured, for example under the control of a user, using the 2D-camera when a movement of the 3D-camera is less than a threshold level, and therefore the 3D-camera is stationary or near stationary. 2D-camera-timing-information is associated with each captured 2D-image.

The steps of the data processing unit receiving the series of 2D-images and 3D-map-data may be carried out in any order or simultaneously.

3D-camera-timing-information associated with one or more locations within the 3D-map-data that correspond to one or more 3D-data-capture-locations with a movement level of the 3D-camera less than the threshold level are identified 326 by the data processing unit.

Each 2D-image is associated 328 with a corresponding location within the 3D-map-data by the data processing unit correlating the 2D-camera-timing-information with the 3D-camera-timing-information associated with the identified 3D-map-data.

Such 'stop-and-go' methodology may allow the 2D-images from any digital camera that captures timestamped images (such as a digital SLR camera, panoramic camera, thermal camera or smartphone) to be combined with time-stamped 3D-map-data, for example. Various aspects of the method of FIG. 3 are discussed in further detail below with reference to FIG. 4.

In some examples, during the capture of the 3D-map-data, a SLAM system may estimate its trajectory in real time. In such examples, the system may be configured to instruct, or remind the user to capture an image using the 2D-camera in response to the movement meeting or falling below the threshold level. Such 3D-camera systems may also be configured to receive confirmation from the user that a 2D-image has been taken using a 2D-camera-device. The 3D-camera may record timing-information associated with such confirmations. Such timing information may supplement the assessment of movement profiles for correlating 3D and 2D datasets.

Figure 4:
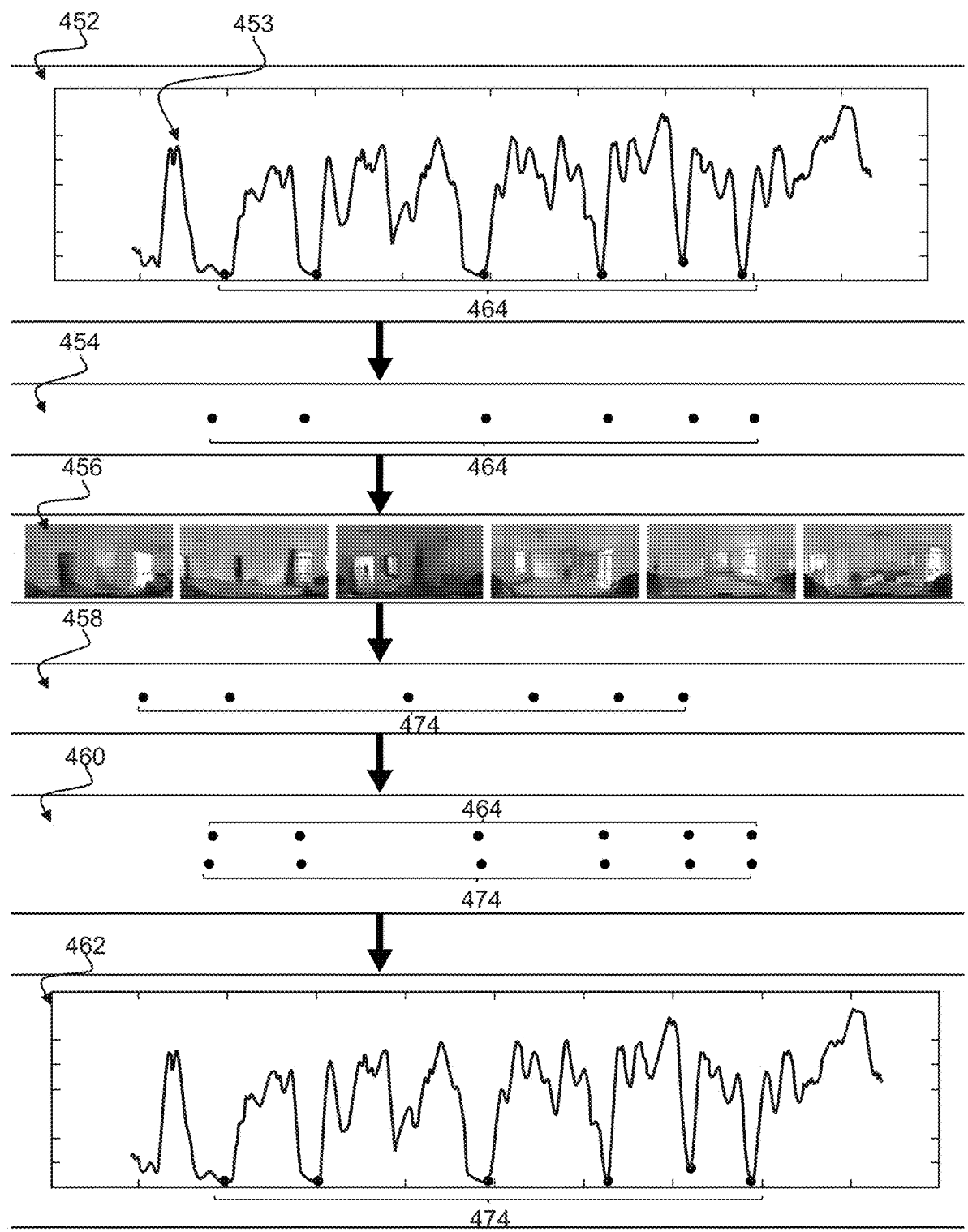
FIG. 4 illustrates another method for matching two-dimensional-images to associated three-dimensional-depth-maps.

FIG. 4 illustrates steps in a method of correlating a series of 2D-images obtained using a 2D-camera with a series of 3D-map-data from a 3D-camera. A trajectory of the 3D-camera may be determined by a comparison of 3D point data between different frames captured by the 3D-camera, as described previously. In this way, a profile of the velocity of the 3D-camera against time may be obtained. Alternatively, a relative displacement or acceleration, or any other differential of the displacement, may be obtained.

As shown in FIG. 4, a profile 452 of the velocity of the 3D-camera is analysed to determine when the 3D-camera is stationary.

Stop-and-go synchronisation approach may establish a common time reference between a 3D-camera-device and a 2D-camera by extracting a unique time signature from both the camera image and 3D datasets. These unique time signatures are then used to derive the timing offset between the camera and 3D-camera-device to establish a common time reference. To extract the unique time signature for the 3D-camera-device, locations at which the 3D-camera-device was stationary (i.e. locations at which the user stopped to capture an image) are identified in the 3D-map-data by looking at the velocity profile of the 3D-camera-device over time during data capture. A 3D-camera-device may calculate a position of a 3D-camera-device in 3D space (x, y and z coordinates) as part of a SLAM processing workflow. The determined x,y,z dataset is referred to as the trajectory of the 3D-camera-device. The x, y and z location of the 3D-camera-device may be recorded, for example, 100 times per second to give a 200 Hz positional trajectory. To calculate a velocity of the 3D-camera-device, the change in x,y,z location between each 100 Hz sample is calculated. This gives the distance that the 3D-camera-device moves between each 100 Hz measurement which is in turn converted to velocity in metres per second. To determine the static points in the 3D-map-data, a simple velocity threshold is used to find all points in the trajectory file where the velocity drops below the velocity threshold. These static locations are then used to define the dataset that is the unique time signature for the 3D-camera-device (we now have time and x,y,z position for each static period.

The times and locations for each period at which the velocity dropped below the velocity threshold (static locations) are automatically identified in the 3D-map-data. This generates a dataset that gives the exact times at which the 3D-camera-device was stationary (in 3D-camera-device time). In this example, the camera is considered to be stationary when its velocity is less than 0.2 m/s. Each data point in the velocity profile is associated with a location in the 3D-map-data so that a corresponding series of time stamps of stationary points 464 can be identified, as shown in step 454.

A series of two-dimensional images is received 456 from a 2D-camera. The 2D-camera is co-located with the 3D-camera during the capture of the 3D-map-data and two-dimensional images, as described previously with reference to FIGS. 1a and 1b. Each 2D image in the series of two-dimensional images 457 is associated with a respective 2D-system-time-stamp, which is an example of 2D-camera-timing-information. As discussed previously, the 2D-system-time-stamp is not necessarily of the same format, and is not synchronised with, the 3D-camera-time-stamps.

2D-system-time-stamps 474 are extracted 458 from the series of 2D-images. As standard, digital images contain an EXIF file that records specific information about the device used to capture images and the time (in 2D-camera-system-time) that the digital image was captured. A unique time signature for the 2D-images may be extracted through reading a timestamp written into EXIF data of each captured image, for example. EXIF data records the exact time at which each image was captured in terms of the camera system time. This generates a dataset of 2D-camera-timing-information that provides exact times at which each 2D-image was captured.

A pattern of the 3D-camera-time-stamps 464 is correlated 460 with a pattern of the 2D-system-time-stamps 474. In this way, the 2D-system-time-stamps 474 may be associated with corresponding 3D-camera-time-stamps 464, as illustrated in step 462, such that a two-dimensional image is associated with a corresponding three-dimensional scene. This full data set comprises two sets of unique time signatures, one that records the times at which the 3D-camera-device was stationary (in 3D-camera-device time), and one that records the times at which each image was captured (in camera system time). Although both datasets are in different time systems, the time interval between each successive data point in each dataset is the same (for example, if the 3D-camera-device is identified as being stationary at 5, 30, 40 and 60 seconds into the data capture, the time interval between each successive static data point would be 25, 10 and 20 seconds. Given that an image is captured by the user at each static location of the 3D-camera-device, the time interval between each captured image would also be 25, 10 and 20 seconds).

To determine a time offset between the camera and 3D-camera-device and establish a common time frame, the unique time signature for the 2D-camera dataset may be matched to the unique time signature for the 3D-map-data using an iterative time synchronisation algorithm that minimises the total time difference between each data point in the 2D-camera time signature dataset and each point in the SLAM time signature dataset. That is, the time offset is calculated by minimising the total time difference between both datasets.

In one example implementation, initially, each data point in the 3D-map-data may be compared to each datapoint in the camera dataset. For each data point in the 3D-map-data, the time difference between each data point in the 2D-camera dataset is calculated. The total time difference between the datasets is calculated by summing the time differences between the 3D-camera and 2D-camera data points. For the next step in the analysis, the timestamp for each image is adjusted by one sample (e.g. 1/100th of a second) and the total time difference between the 3D-camera and 2D-camera data points is again calculated. Adjusting the timestamp of the image essentially 'slides' the camera data points along the trajectory. By iteratively adjusting the timestamp of the image by one sample each iteration, the 2D-camera time signature (timing-information) converges towards the 3D-camera time signature (timing-information) until the total time difference between the 3D-map-data and 2D-image datasets is minimised. When the total time difference between both datasets is at the minimum, the convergence point has been identified. The image timestamps have now been adjusted to match the static data points in the trajectory. The images can now be located in 3D space by extracting the x,y,z position from the trajectory for each of the corresponding static data points in the 3D-map-data.

The output of the time synchronisation algorithm is a combined, localised image dataset, where each 2D-image in the series of 2D-images is correctly located within the 3D-camera-device 3D map dataset. It has been found that an iterative pattern matching approach, such as that described above, provides improved performance in synchronising the series of 2D images and 3D-map-data and may be used to overcome difficulties that would otherwise result from deviant user behaviour such as:

taking multiple photographs in a single location to capture an acceptable image,
stopping or pausing in some locations without taking photos,
taking photos some while moving slightly, or
variations in the amount of time spent stationary to take a photo.

In this way, the performance of the pattern matching processes may provide a better match between datasets compared to matching 2D-images to corresponding locations in the 3D-map-data using only the order in which the 2D-images were captured; that is, assigning each 2D-image in turn to each successive location at which the 3D-camera is stationary.

The invention claimed is:

1. A data processing unit configured to:
receive three-dimensional, 3D, map-data, in which a plurality of locations within the 3D-map-data are associated with respective 3D-data-capture-locations of a 3D-camera, and in which 3D-camera-timing-information is associated with each of the plurality of locations;
receive one or more two-dimensional, 2D, images from a 2D-camera, in which 2D-camera-timing-information is associated with each 2D-image, and in which each 2D-image is captured when a movement of the 3D-camera is less than a threshold level;
identify 3D-camera-timing-information associated with locations within the 3D-map-data that correspond to 3D-data-capture-locations with a movement of the 3D-camera less than the threshold level;
associate, in a combined dataset, each 2D-image with a corresponding location within the 3D-map-data by correlating the 2D-camera-timing-information with the identified 3D-camera-timing-information.

2. The data processing unit of claim 1 configured to correlate the 2D-camera-timing-information with the 3D-camera-timing-information associated with the identified locations within the 3D-map-data by:
identifying a pattern in the 2D-camera-timing-information;
identifying a pattern in the 3D-camera-timing-information; and
matching, in the time domain, corresponding 2D-camera-timing-information and 3D-camera-timing-information of the respective patterns.

3. The data processing unit of claim 2 configured to match corresponding 2D-camera-timing-information and 3D-camera-timing-information of the respective patterns by iteratively adjusting an offset between the 2D-camera-timing-information and 3D-camera-timing-information in order to improve a correspondence between the pattern of 2D-camera-timing-information and the pattern of 3D-camera-timing-information.

4. The data processing unit of claim 1 in which the threshold level relates to the 3D-camera being stationary.

5. The data processing unit of claim 1 in which the 2D-camera is co-located with the 3D-camera during capture of the 3D-map-data and one or more 2D-images.

6. The data processing unit of claim 5 in which timing systems of the 2D-camera-device and 3D-camera-device are not synchronized.

7. The data processing unit of claim 5 further configured to determine a movement profile of the 3D-camera based on the 3D-map-data.

8. The data processing unit of claim 7 configured to determine when a movement of the 3D-camera is less than the threshold level based on the movement profile.

9. A method comprising:
receiving three-dimensional, 3D, map-data, in which a plurality of locations within the 3D-map-data are associated with respective 3D-data-capture-locations of a 3D-camera, and in which 3D-camera-timing-information is associated with each of the plurality of locations;
receiving one or more two-dimensional, 2D, images from a 2D-camera, in which 2D-camera-timing-information is associated with each 2D-image, and in which each 2D-image is captured when a movement of the 3D-camera is less than a threshold level;
identifying 3D-camera-timing-information associated with locations within the 3D-map-data that correspond to 3D-data-capture-locations with a movement of the 3D-camera less than the threshold level;
associating, in a combined dataset, each 2D-image with a corresponding location within the 3D-map-data by a data processing unit correlating the 2D-camera-timing-information with the identified 3D-camera-timing-information.

10. The method of claim 9 in which correlating the 2D-camera-timing-information with the 3D-camera-timing-information associated with the identified locations within the 3D-map-data comprises:
identifying a pattern in the 2D-camera-timing-information;
identifying a pattern in the 3D-camera-timing-information; and
matching, in the time domain, corresponding 2D-camera-timing-information and 3D-camera-timing-information of the respective patterns.

11. The method of claim 10 in which matching corresponding 2D-camera-timing-information and 3D-camera-timing-information of the respective patterns comprises iteratively adjusting an offset between the 2D-camera-timing-information and 3D-camera-timing-information in order to improve a correspondence between the pattern of 2D-camera-timing-information and the pattern of 3D-camera-timing-information.

12. The method of claim 9 in which the threshold level relates to the 3D-camera being stationary.

13. The method of claim 9 in which the 2D-camera is co-located with the 3D-camera during capture of the 3D-map-data and one or more 2D-images.

14. The method of claim 9 in which timing systems of the 2D-camera-device and 3D-camera-device are not synchronized.

15. The method of claim 9 comprising determining a movement profile of the 3D-camera based on the 3D-map-data.

16. The method of claim 15 comprising determining when a movement of the 3D-camera is less than the threshold level based on the movement profile.

17. The method of claim 9 comprising capturing, by a user, a 2D-image using the 2D-camera when a movement of the 3D-camera is less than a threshold level.

18. The method of claim 17 comprising instructing the user to capture an image using the 2D-camera in response to the movement of the 3D-camera meeting the threshold level.

19. The method of claim 9 comprising removably attaching a housing of the 2D-camera to a housing of the 3D-camera.

20. A non-transitory computer readable storage medium comprising computer program code configure to cause a processor to:

- receive three-dimensional, 3D, map-data, in which a plurality of locations within the 3D-map-data are associated with respective 3D-data-capture-locations of a 3D-camera, and in which 3D-camera-timing-information is associated with each of the plurality of locations;
- receive one or more two-dimensional, 2D, images from a 2D-camera, in which 2D-camera-timing-information is associated with each 2D-image, and in which each 2D-image is captured when a movement of the 3D-camera is less than a threshold level;
- identify 3D-camera-timing-information associated with locations within the 3D-map-data that correspond to 3D-data-capture-locations with a movement of the 3D-camera less than the threshold level;
- associate, in a combined dataset, each 2D-image with a corresponding location within the 3D-map-data by a data processing unit correlating the 2D-camera-timing-information with the identified 3D-camera-timing-information.

* * * * *